June 29, 1943.　　　W. J. LAMMERDING　　　2,323,057
ASSEMBLING AND TESTING FIXTURE
Filed April 5, 1941
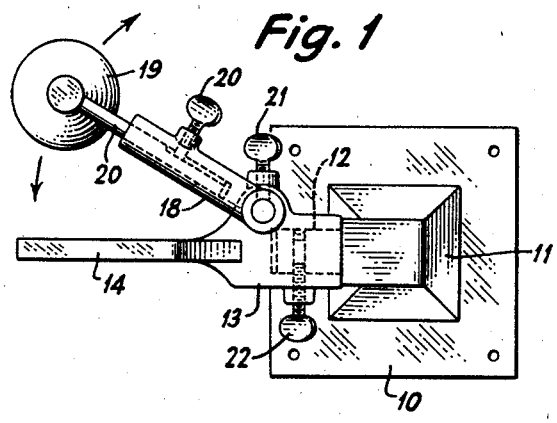
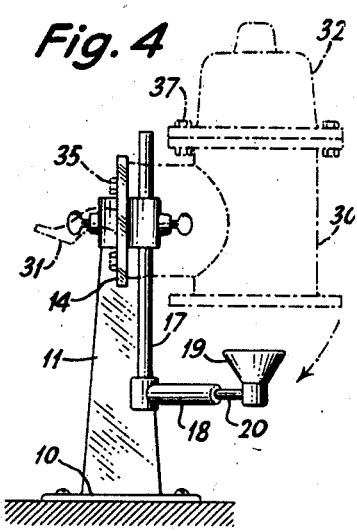
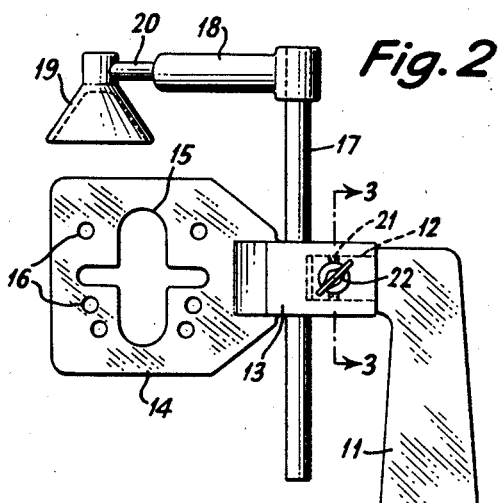
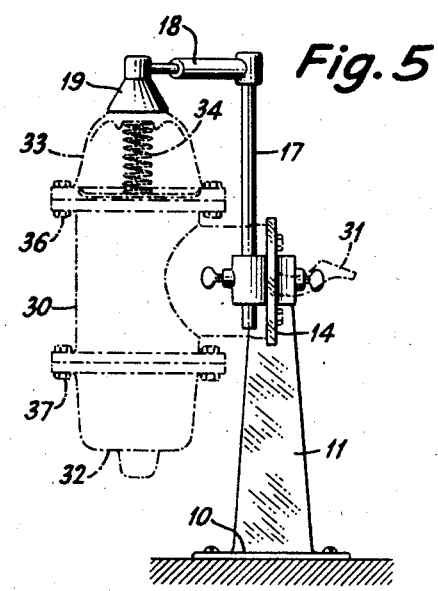
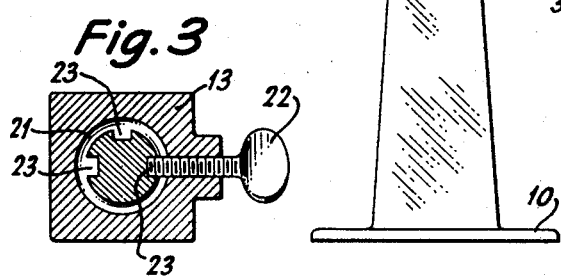
INVENTOR.
WILLIAM J. LAMMERDING
BY *William A. Zalesak*
ATTORNEY.

Patented June 29, 1943

2,323,057

UNITED STATES PATENT OFFICE 2,323,057

ASSEMBLING AND TESTING FIXTURE

William J. Lammerding, Roselle Park, N. J.

Application April 5, 1941, Serial No. 387,099

5 Claims. (Cl. 29—89)

My invention relates to assembling and testing fixtures, more particularly to an improved fixture for the assembling and testing of multi-part fuel pumps.

Certain present types of fuel pumps used in connection with automotive gas engines are made in two or three parts and during assembly require the positioning of movable parts and also the compression of a spring to permit the pump to be assembled. With the present type of fixtures available, this process is difficult and requires a great amount of time, since present types of fixtures during some part of the assembly require the use of one hand to hold the parts assembled while adjusting or bolting with the other.

It is, therefore, the principal object of my invention to provide an assembling and testing fixture particularly suitable for assembling and testing of multi-part fuel pumps and like devices.

More particularly it is an object of my invention to provide such a fixture which will facilitate assembly and temporarily hold the parts of the device in assembled position while an operator easily adjusts, locks or bolts the parts of the device together without the necessity of manually holding any of the parts in an assembled position during the assembling operation.

Another object of my invention is to provide such a fixture which is strong and simple in construction.

A still further object of my invention is to provide such a fixture which can be easily adjusted to different operating positions for facilitating assembly of the device being assembled.

A still further object of my invention is to provide such a fixture which is positive in operation and which reduces substantially the time required for the assembling operations.

The novel features which I believe to be characteristic of my invention are set forth with particularity in the appended claims, but the invention itself will best be understood by reference to the following description taken in connection with the accompanying drawing in which Figure 1 is a plan view of an assembly fixture, Figure 2 is a side elevation, Figure 3 is a section taken along line 3—3 of Figure 2, Figures 4 and 5 show the fixture in different positions in use during assembly of a device being worked on.

Referring to the drawing the fixture comprises a base 10 supporting a pedestal 11 having extending from one side thereof a stud 12. Rotatably and slidably mounted upon this stud is an enlarged extension 13 supporting an assembly plate 14 provided with a large central aperture 15 for purposes to be described and smaller apertures 16 for receiving temporary supporting bolts during the assembly operation.

Rotatably and slidably mounted in extension 13 for engaging the device being assembled is a rod or shaft 17 supporting at its upper end a bracket 18. A hold-down cup 19 is supported at the end of the rod 20 slidably received within the bracket 18. A set screw 20 may be provided for fixing the positions of the cup with respect to the bracket and a second set screw 21 for fixing the angular position and the height of the shaft 17 and the hold-down cup 19. While the hold-down cup, bracket and shaft are shown mounted on the extension 13, they could obviously be mounted on the pedestal or base and function, however the form shown is more flexible and desirable.

As best shown in Figures 2 and 3, the stud 12 is provided with a semi-circular recess extending around the stud for receiving the end of the set screw 22 to prevent longitudinal movement of the extension and plate with respect to the stud. A number of recesses 23 are provided for receiving the end of the set screw 22 for positively fixing the angular position of the plate and hold-down cup during various operations while the fixture is in use.

While the device to be assembled may consist of two or three parts in the illustrations shown in Figures 4 and 5, the device is shown as made of three parts. In the first step of assembly the part 30 provided with the lever 31 for operating the pump diaphragms is mounted on the assembly plate 14 with the lever extending through the aperture 15, the portion 30 being secured to the mounting plate by bolts 35. In this position the top dome portion 32 may be fixed to the portion 30 and then the device rotated in a clockwise direction as indicated to the position shown in Figure 5. The portion 33 with spring 34 under compression is then positioned over the portion 30 and the hold-down cup rotated into position to maintain parts 30 and 33 in engagement while the bolts 36 are put in position to fix the parts together, the hold-down cup holding the parts together against the compression spring 34. This frees both hands for the operation. After the assembly the hold-down cup may be retracted from engaging position and swung out of the way, permitting release of the assembled pump. With the arrangement shown the device may be moved to a horizontal position to permit ready adjustment of the lever 31. Thus with the device shown the hands of the operator are free at all times to adjust and to assemble the parts of the mechanism and to place the nuts and bolts in place. The device is simple, rugged and effective, and reduces the assembly time in some cases as much as 50%.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim as new is:

1. An assembly fixture for receiving and holding together during assembly, two parts of a multi-part article of manufacture including a body and a part to be fastened to one end of said body under the force of a spring, said fixture including a base, means rotatably mounted on said base, a mounting plate being secured to said means, the plane of said mounting plate being parallel to the axis of rotation afforded by said means and being adapted to have the body of the article secured thereto, an elongated element, means slidably mounting said element on said means for movement in a plane parallel to said plate and being constructed to allow rotation of said elongated element on an axis parallel to the face of said plate, an extension on said elongated element supporting a member provided with an engaging surface disposed in a plane transverse with respect to the face of said plate to hold said part in position on said body with the spring under compression, said structure enabling said member to be moved to an inoperative position while a body is attached to said plate and then moved into operative position and lowered to compress the spring and clamp the part to said body, and means for holding said member in its lowered position.

2. An assembly fixture for receiving and holding together during assembly two parts of a multi-part article of manufacture including a body and a part to be fastened to one end of said body under the force of a spring, said fixture including a base, a stud extending from said base, means rotatably mounted on said stud, a mounting plate being secured to said means, said mounting plate having an enlarged central aperture therein, the plane of said mounting plate being parallel to the axis of rotation afforded by said means on said stud, and being adapted to have the body of the article secured thereto, an elongated element, means slidably mounting said element on the rotatably mounted means for movement in a plane parallel to said plate and being constructed to allow rotation of said elongated element on an axis parallel to the face of said plate, an extension slidably mounted on said elongated element and supporting a cup-shaped member provided with an engaging surface disposed in a plane transverse to the face of said plate to hold said part in position on said body with the spring under compression, said structure enabling said member to be moved to an inoperative position when the body is attached to said plate and then moved into operative position and lowered to clamp the part to said body, means for fixing said member in its lowered position, other means to hold said cup-shaped member in fixed position on said elongated element, a set screw carried by the rotatably mounted means, said stud being provided with a plurality of recesses for receiving the end of said screw for maintaining said plate in a predetermined position.

3. An assembly fixture for receiving and holding together during assembly two parts of a multi-part article of manufacture including a body and a part to be fastened to one end of said body under the force of a spring, said fixture including a base, means rotatably mounted on said base, a mounting plate being secured to said means, said mounting plate having an enlarged central aperture therein, the plane of said mounting plate being parallel to the axis of rotation afforded by said means on said stud, and being adapted to have the body of the article secured thereto, an elongated element, means slidably mounting said element on the rotatably mounted means for movement in a plane parallel to said plate and being constructed to allow rotation of said elongated element on an axis parallel to the face of said plate, an extension on said elongated element supporting a member provided with an engaging surface disposed in a plane transverse to the face of said plate to hold said part in position on said body with the spring under compression, said structure enabling said member to be moved to an inoperative position when the body is attached to said plate and then moved into operative position and lowered to clamp the part to said body, means for fixing said member in its lowered position, and means for fixing the rotatably mounted means and said plate in a predetermined position.

4. An assembly fixture for receiving and holding together during assembly two parts of a multi-part article of manufacture including a body and a part to be fastened to one end of said body under the force of a spring, said fixture including a base, a stud extending from said base, means rotatably mounted on said stud, a mounting plate being secured to said means, said mounting plate having an enlarged central aperture therein, the plane of said mounting plate being parallel to the axis of rotation afforded by said means on said stud, and being adapted to have the body of the article secured thereto, an elongated element, means slidably mounting said element on the rotatably mounted means for movement in a plane parallel to said plate and being constructed to allow rotation of said elongated element on an axis parallel to the face of said plate, an extension on said elongated element supporting a member provided with an engaging surface disposed in a plane transverse to the face of said plate to hold said part in position on said body with the spring under compression, said structure enabling said member to be moved to an inoperative position when the body is attached to said plate and then moved into operative position and lowered to clamp the part to said body, means for fixing said member in its lowered position, a set screw carried by the rotatably mounted means, said stud being provided with a plurality of recesses for receiving the end of said set screw for maintaining said plate in a predetermined position.

5. An assembly fixture for receiving and holding together during assembly two parts of a multi-part article of manufacture including a body and a part to be fastened to one end of said body under the force of a spring, said fixture including a base, means rotatably mounted on said base, a mounting plate being secured to said means, said mounting plate having an enlarged central aperture therein, the plane of said mounting plate being parallel to the axis of rotation afforded by said means on said base and being adapted to have the body of the article secured thereto, an elongated element, means slidably mounting said element on the rotatably mounted means for movement in a plane parallel to said plate and being constructed to allow rotation of said elongated element on an axis parallel to the face of said plate, an extension slidably mounted on said elongated element supporting a member provided with an engaging surface disposed in a plane transverse to the face of said plate to hold said part in position on said body with the spring under compression, said structure enabling said member to be moved to an inoperative position when the body is attached to said plate and then moved into operative position and lowered to clamp the part to said body, means for fixing said member in its lowered position, and other means to hold said extension in fixed position on said elongated element.

WILLIAM J. LAMMERDING.